Feb. 20, 1951     J. R. OSBORNE     2,542,207
METHOD OF PREPARING TRIAL DENTURES
Filed Sept. 3, 1946

J. R. Osborne
Inventor

By CA Knowles
Attorneys.

Patented Feb. 20, 1951

2,542,207

UNITED STATES PATENT OFFICE 2,542,207

METHOD OF PREPARING TRIAL DENTURES

James R. Osborne, Shelby, N. C.; James William Osborne executor of said James R. Osborne, deceased Application September 3, 1946, Serial No. 694,562

1 Claim. (Cl. 18—55.1)

My present invention relates to an improved method of preparing trial dentures and has for its prime purpose the elimination of the tedious and time consuming steps in the preparation of dentures relating to the forming of a wax trial plate and the succeeding step of placing the teeth in the softened wax trial plate singly and by hand.

According to my invention, the cast mold of the opposite jaw is used and a standard wax plate with teeth positioned therein, of various sizes of course, is softened and fitted to the mold of the opposite jaw in a single operation requiring only a few minutes as opposed to the present method requiring hours of time and tedious labor.

In the accompanying drawings I have illustrated one complete example of the physical embodiment of my invention according to the best mode I have thus far devised but it will be understood that various changes and alterations may be made in the exemplified structure within the scope of the appended claim.

In the drawings—

Figure 1:
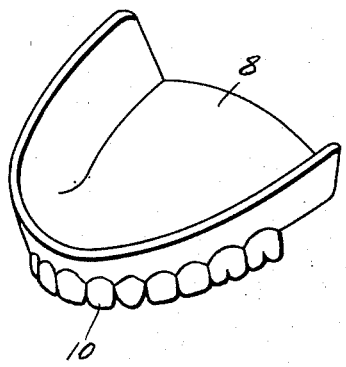
Figure 1 is a perspective view of the trial denture with the teeth fixed therein to be softened and fitted to the mold.
Figure 2:
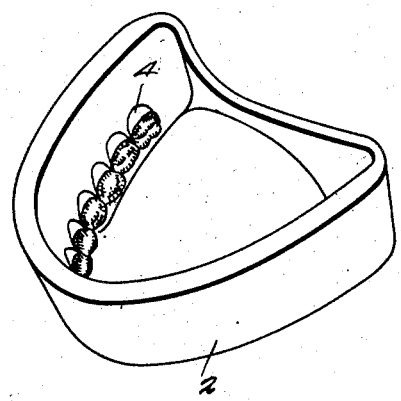
Figure 2 is a perspective view of the cast mold of a lower jaw.
Figure 3:
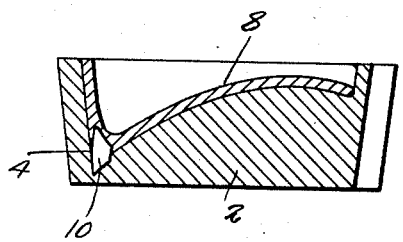
Figure 3 is a vertical sectional view of the mold and the trial plate fitted therein.

Referring now to the drawings, I have illustrated the manner of application of the method of my invention with the exemplified structures wherein I employ a mold 2 of plaster of Paris or other suitable material having recesses 4 therein for the simulated teeth of the lower jaw. Obviously the method will be applicable to either jaw and it will be understood that reference to the lower jaw mold and the upper jaw plate is illustrative only.

The plaster mold of the lower jaw is made in the conventional manner and when ready I select from a graduated set of prepared upper jaw trial plates an approximately fitting plate 8 of wax having the normal and usual teeth 10 positioned therein.

This trial plate of approximate size and shape of the plastic mold is then warmed to soften the wax body thereof and the trial plate is then firmly impressed into the plastic mold of the lower jaw while the trial plate is in a softened condition, the trial plate conforming to the contour of the plastic mold while the teeth of the trial plate move into the recesses or tooth impressions of the plastic mold formed by the teeth of the lower jaw in making the plastic mold, aligning the upper teeth for proper position with respect to the teeth of the lower jaw, when the permanent plate is formed in the usual way, using the trial plate as a pattern.

This completes the preparation of the so-called trial plate from which the permanent denture is made by conventional means, but in applying the trial plate with the teeth fitted therein by machine or other means at the factory, the tedious and long task of fitting the teeth individually is eliminated.

By the use of the method of my invention many hours will be saved with an accompanying saving in the cost of the dentures and the use of my method will be beneficial to dental technicians and the patient alike.

Having thus fully described my invention what I claim as new and desire to secure by Letters Patent is:

A method of aligning the teeth of a trial denture with the teeth of the opposite jaw of the mouth in which the denture is to be positioned, consisting in providing a mold with teeth cavities, the mold being made from the teeth of the jaw of the mouth opposite to the jaw for which the trial denture is made, selecting a denture from a standard graduated set of wax dentures including teeth of approximate size of the cavities of said mold, subjecting the wax denture to heat softening the wax denture, impressing the softened denture into said mold, the teeth of the denture moving into the tooth cavities of the mold aligning the teeth of the denture with the tooth cavities of the mold, removing said softened denture from the mold and finally allowing said wax denture to harden.

JAMES R. OSBORNE.

REFERENCES CITED

The following references are of record in the file of this patent:

UNITED STATES PATENTS

| Number | Name | Date |
|--------|------|------|
| 113,736 | Brockway | Apr. 18, 1871 |
| 125,979 | Newton | Apr. 23, 1872 |
| 829,997 | Ollendorff | Sept. 4, 1906 |
| 1,774,907 | Stroe | Sept. 2, 1930 |